United States Patent [19]
Lee et al.

[11] Patent Number: 5,734,629
[45] Date of Patent: Mar. 31, 1998

[54] CD TRANSPORTER

[75] Inventors: John S. Lee, Coon Rapids; Roger E. Haro, Eden Prairie; David Rother, Hastings; Donald Hollerich, Edina, all of Minn.

[73] Assignee: Rimage Corporation, Minneapolis, Minn.

[21] Appl. No.: 579,927

[22] Filed: Dec. 28, 1995

[51] Int. Cl.$^6$ .................................................. G11B 17/22
[52] U.S. Cl. ................................................................ 369/34
[58] Field of Search .......................... 360/92; 369/34, 369/37, 30, 35, 36; 364/478.06, 478.03; 414/273, 274, 277, 281, 331

[56] References Cited

U.S. PATENT DOCUMENTS

| | | | |
|---|---|---|---|
| 4,912,575 | 3/1990 | Shiosaki | 369/34 |
| 5,232,505 | 8/1993 | Novak et al. | 118/712 |
| 5,285,333 | 2/1994 | Barr et al. | 360/92 |
| 5,429,470 | 7/1995 | Nicol | 360/92 |
| 5,498,116 | 3/1996 | Woodruff et al. | 360/92 |
| 5,518,325 | 5/1996 | Kahle | 400/70 |
| 5,543,001 | 8/1996 | Casillo et al. | 156/60 |
| 5,546,315 | 8/1996 | Kleinschnitz | 369/34 |

FOREIGN PATENT DOCUMENTS

| | | |
|---|---|---|
| 0528106 | 8/1991 | European Pat. Off. . |
| 2217107 | 10/1989 | United Kingdom . |

OTHER PUBLICATIONS

"Kodak Disc Transporter" *Product Description and Specifications*, Brochure from Eastman Kodak Company, 343 State Street, Rochester NY 14650, 1994 No Month.

"Kodak PCD Writer 600", *Product Description and Specifications*, Brochure from Eastman Kodak Company, 343 State Street, Rochester, NY 14650, 1994 No Month.

*Primary Examiner*—Robert S. Tupper
*Assistant Examiner*—David D. Davis
*Attorney, Agent, or Firm*—Schwegman, Lundberg, Woessner, & Kluth, P.A.

[57] ABSTRACT

An apparatus for recording and verifying information recorded on compact disks and for printing label information on the disks, and a method of operating the apparatus, wherein the respective recorders, verifiers, and printers are vertically stacked in a housing, and a vertically movable carriage is arranged to transport compact disks to each of the stacked devices. A rotatable carousel is mounted to the housing beneath the carriage; the carousel having multiple bins for receiving and holding compact disks. A computer processor controls the actuation of the respective devices, the carriage, and the carousel, to sequentially process unrecorded compact disks through the steps of recording, verifying and printing, and to reject compact disks which have failed the verification tests. A camera may be connected to the housing and used in conjunction with the computer processor to rotatably position a compact disk into a preferred position prior to the printing step.

27 Claims, 3 Drawing Sheets

CD TRANSPORTER

BACKGROUND OF THE INVENTION

The present invention relates to an apparatus for automating the processing steps required for producing multiple copies of compact disks with prerecorded information; more particularly, the invention relates to an apparatus for automatically loading a blank compact disk from an input bin to a transporter, transporting the compact disk to a recorder, recording data on the compact disk, transporting the disk to a reader, reading the data from the disk to verify the accuracy of the recording process, transporting the disk to a printer for printing label information onto the disk, and depositing the disk into either an output bin or a reject bin.

Compact disks (CDs) are plastic disks about 12 centimeters (cm) in diameter on which data may be recorded, usually by a stamping process or by a laser process where digital (binary) information is stored by selectively burning extremely small spots about circumferential tracks on the disk. The CD may typically receive its stored information one or more times, and it may be read by appropriate CD readers many times without harming or degrading the stored information. Such CDs are known as CD-R, which indicates that they are recordable CDs. In the context of the present invention, it is to be understood that reference to "CD" includes and preferably encompasses "CD-R". Since a very high density of information may be stored on a CD, it is capable of holding extremely large amounts of data, far exceeding the capabilities of magnetically recorded disks. CDs are typically manufactured in mass production quantities with prerecorded software programs, for commercial sale to users of computers and computer software.

The present invention speeds up and improves the steps involved in the manufacturing process for recording and preparing a CD by significantly reducing the number of manual handling steps required to record, verify and print label information on a CD.

SUMMARY OF THE INVENTION

The invention comprises a CD transporter which includes a rotatable carousel having at least three bins for holding CDs in some quantities, an elevator and CD gripper which is positionable over the carousel, one or more CD recorders and data verifiers vertically stacked adjacent the elevator, and a CD printer vertically positioned adjacent the elevator. A rotatable positioner may be used in conjunction with the printer, to rotate a CD into a preferred position prior to insertion into the printer. A control mechanism including position sensors activates the carousel and elevator to permit a blank CD to be lifted from a storage bin and successively or selectively transported to the recorder, the verifier and the printer for processing, and then placing the processed CD in an output bin on the carousel. A reject bin is provided for depositing a disk that does not pass the testing provided by the verifier.

It is a principal object and advantage of the present invention to provide an automation device for recording, verifying and printing label information on compact disks, as a part of a commercial manufacturing operation for such recordable disks.

It is another object and advantage of the invention to provide a sorting device wherein defective compact disks may be sorted separately from good disks and collected in a reject bin for subsequent disposal.

It is another object and advantage of the present invention to provide an automation device for selectively recording, verifying or printing label information on compact disks, in any order or sequence.

It is a further object and advantage of the present invention to provide a printing device for orienting a disk to a preferred rotational position for printing label information on a preselected area of the disk.

It is another object and advantage of the present invention to provide an apparatus for reading label information printed on a disk Other and further objects and advantages of the invention will become apparent from the following specification and claims and with reference to the drawings.

DESCRIPTION OF THE PREFERRED EMBODIMENT

Figure 1:
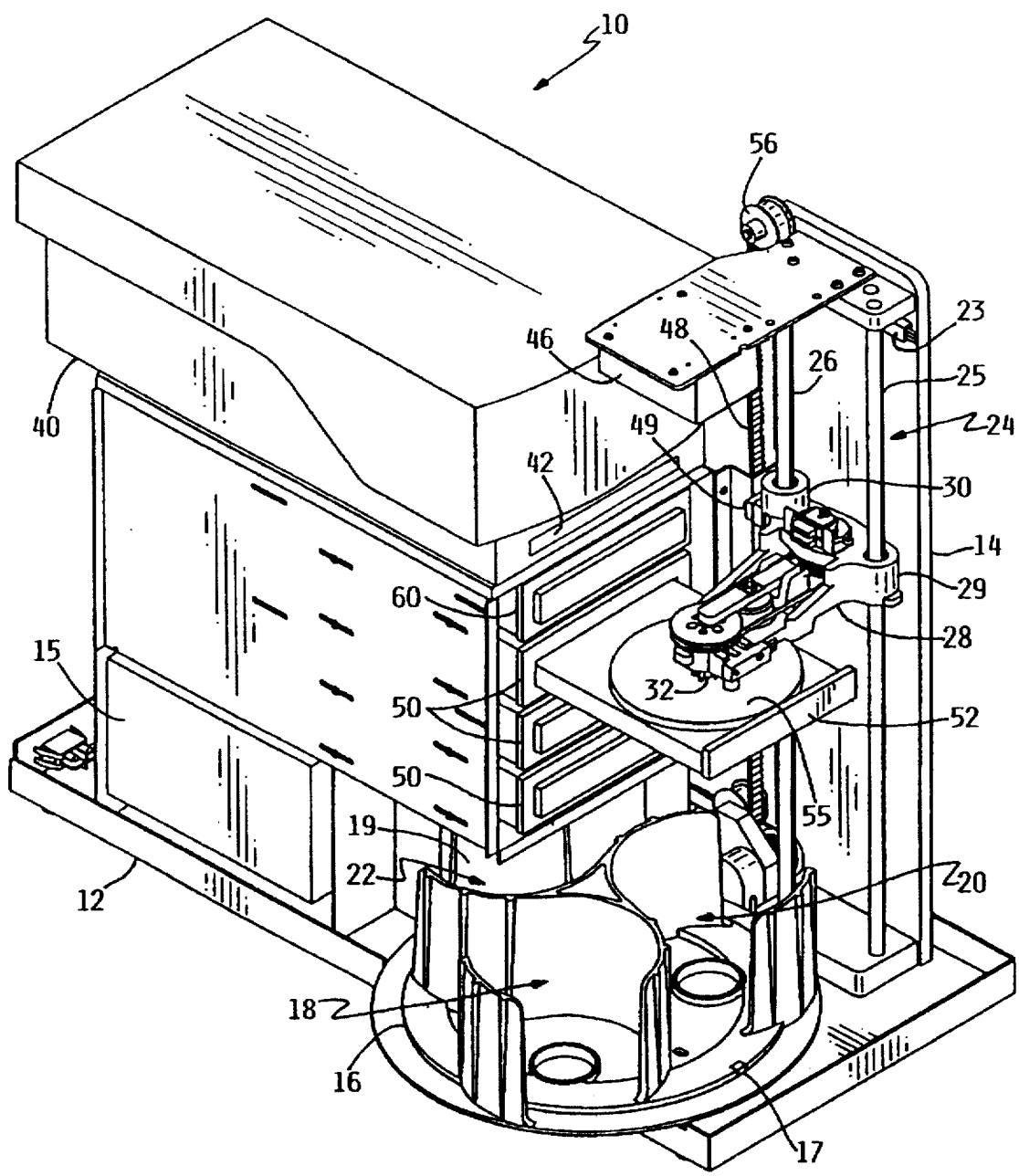
FIG. 1 shows the invention in front isometric view.

Referring to the Figures, transporter 10 has a base 12 and a vertical support frame 14. A carousel turntable 16 is rotatably mounted to base 12, and three CD bins 18, 20 and 22 are affixed to turntable 16. One of these bins functions as an input or supply bin, the second bin functions as an output bin, and the third bin functions as a reject collection bin. The carousel turntable 16 is rotatably controllable by a stepper or servo motor 19 which is connected to carousel turntable 16 by an endless loop belt beneath the base 12. The motor 19 is preferably positionable to three stop positions by a computer processor 15, which also controls the other functions to be hereinafter described, in conjunction with position sensors which are selectively placed to monitor positions of the various moving components. For example, carousel 16 has an index mark 17 which may be sensed by an optoelectric sensor (not shown) to detect the "home" position of carousel 16.

A carriage assembly 24 is affixed to base 12 by a pair of guide shafts 25, 26. Carriage assembly 24 has a carriage 28 which is slidably movable over guide shafts 25, 26 via a pair of yokes 29, 30 which have bearing surfaces to facilitate slidable movement. Carriage 28 is vertically movable from a lower position proximate turntable 16 to an upper "home" position aligned with the topmost component of transporter 10. An optoelectric sensor 23 is affixed proximate the upper end of frame 14 to detect when the carriage 28 is in its "home" position.

Figure 3:
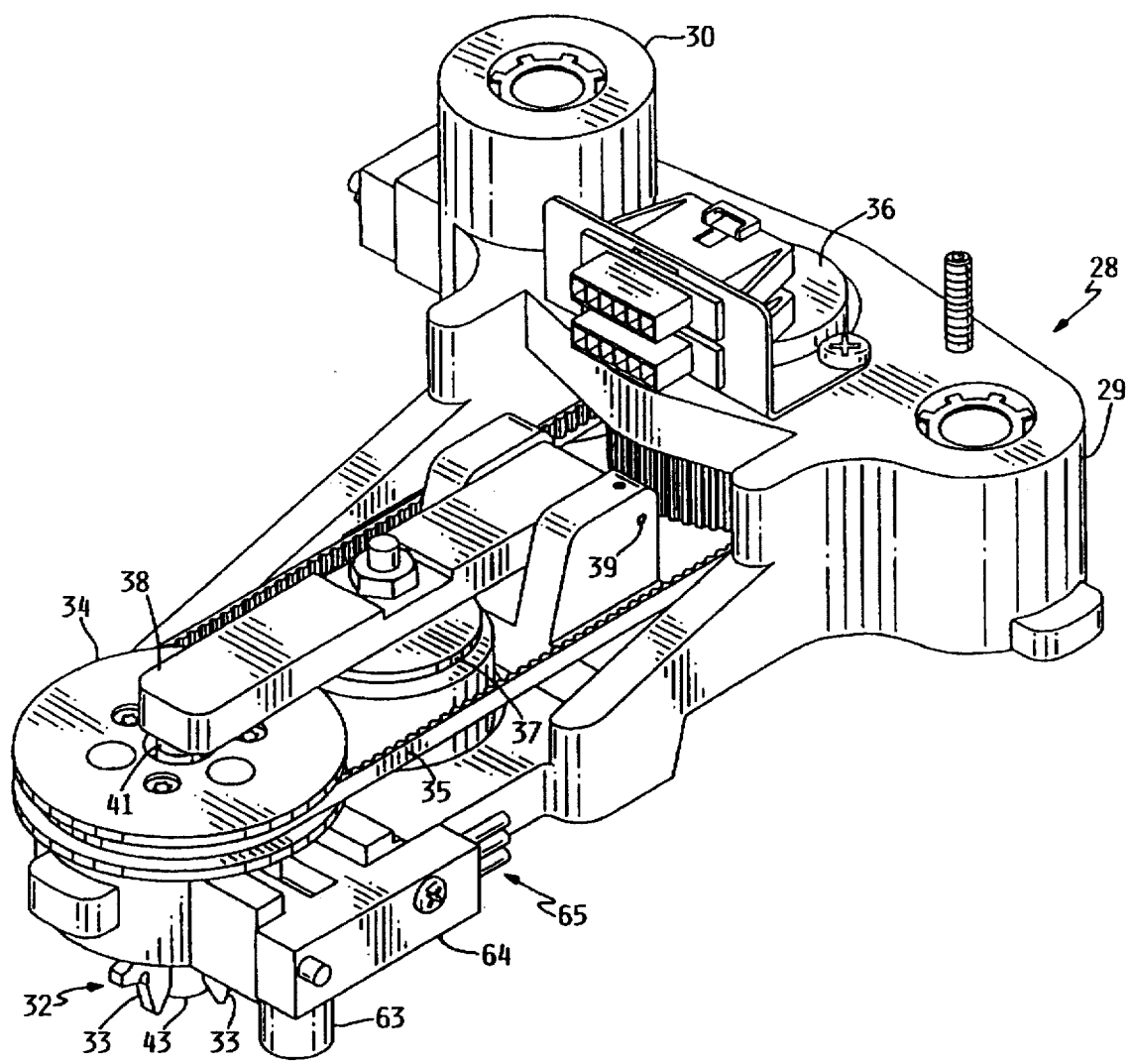
FIG. 3 shows an isometric view of the carriage.

Carriage 28 has a gripper 32 affixed to its underside, best seen with reference to FIG. 3. Gripper 32 has three expandable and contractible fingers 33 for insertion into the center hole of a CD and expanding to grasp the CD by its center hole for movement. The expansion and contraction of the gripper fingers 33 is controllable by a solenoid 37, and the solenoid 37 is controllable by the aforementioned computer processor 15. Solenoid 37 has an arm 38 which is pivotally movable about a pin 39. The distal end of arm 38 is contacts a downwardly directed rod 41 which passes through the center of the gripper fingers 33, and terminates in a conical head 43. Conical head 43 is sized to spread gripper fingers 33 apart when it is raised and to permit gripper fingers 33 to come together when it is lowered. Arm 38 is spring biased in an upward direction so as to cause conical head 43 to spread gripper fingers 33 apart in the normal or deactivated position, thereby providing a gripping force against a CD when the fingers 33 have been inserted into the CD center hole. When solenoid 37 is energized, arm 38 is pulled downwardly and conical head 43 permits gripper fingers 33 to come together, thereby releasing the holding force on a CD. A vertically-movable post 63 is located adjacent the gripper fingers 33 and is upwardly movable when the gripper fingers 33 are engaged into a CD, because the upper surface of the CD engages the post 63 and moves it upwardly. An optoelectric sensor 64 is positioned in carriage 28 to detect the upper position of post 63; the sensor 64 generates electrical signals which are coupled to the computer processor 15 via conductors 65 to signal the computer processor when a CD is engaged by the gripper fingers 33.

The rod 41 of gripper 32 is attached to a rotatable pulley 34. Pulley 34 may be rotated by a belt 35 connected to a gripper motor 36. Motor 36 is preferably a stepper motor which is controllable by the aforementioned computer processor 15 to rotatably align a CD which is gripped by gripper 32 for purposes which will be hereinafter described.

A printer 40 is positioned proximate the upper end of support frame 14, and printer 40 has an opening 42 positioned adjacent the path of travel of carriage 28. A printer drawer may be opened outwardly from opening 40, and may be pulled inwardly into printer 40, all under control of the computer processor 15. The drawer has a circular seat sized to receive a CD which may be deposited therein by selective movement of carriage 28 and gripper 32.

Printer 40 may be operated in conjunction with the rotatable pulley 34 and gripper 32, particularly in cases where certain information has been preprinted onto a CD surface, and the printer is to be used to print certain additional information related to the information stored on the CD. In such cases, it is important that the printer only print information on selected areas of the CD surface and not overprint on areas which have been preprinted. The motor 36 is activated to rotate pulley 34 and a gripped CD to rotatably align the CD for proper insertion into the printer 40. A camera 46 is affixed to the upper end of frame 14, and camera 46 has a downward field of view focused to image the CD surface when the CD is elevated to a proper position on the carriage 28. The video image of the CD surface is transformed into a digital bit map by the processor 15, and this digital bit map may be compared to a prestored bit map which is representative of the preferred rotatable position of the CD. If the viewed image does not correspond to the prestored bit map image, the motor 36 is activated to rotate the CD until a positive comparison is reached, at which position the CD is ready for insertion into the printer 40. This enables the processor 15 to recognize the preprinted material on the CD and then to rotatably position the CD to place the target print area on the CD in position for printing.

Alternatively, the camera 46 may be used in conjunction with processor 15 to read or verify printed information on the surface of the CD. This operation may be performed after a printing operation has been completed, as a check on the printing operation, or as an independent operation to read printed information on disks which may be loaded into the carousel bins.

One or more recorders 50 may be stacked in vertical arrangement adjacent to vertical frame 14, and each recorder 50 has a recorder drawer 52 which may be extended to receive a CD from gripper 32 on carriage 28. Each recorder 50 is equipped to record data on the CD in any format or arrangement dictated by the computer processor 15. FIG. 1 shows a recorder drawer 52 in an open position with the carriage 28 positioned to load or unload a CD into drawer 52.

A verifier 60 may also vertically stacked adjacent to frame 14. Verifier 60 has a drawer which operates similarly to that of recorder 50 to receive a CD from carriage 28. Verifier 60 functions to read the data stored on a CD, usually after a recorder 50 has completed its recording operation, and to verify the correctness of this data by comparison to the data prestored in the computer processor 15.

Figure 2:
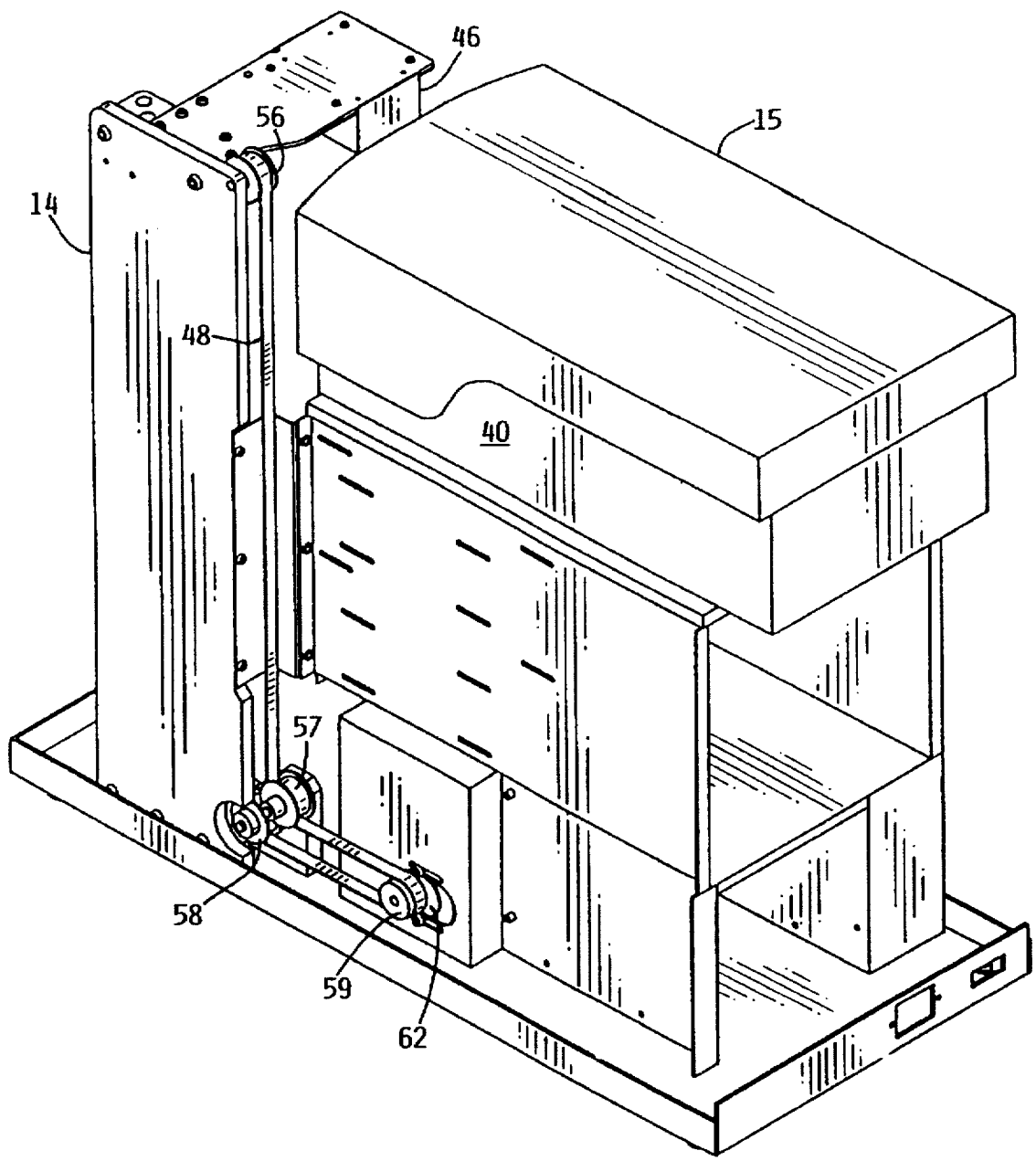
FIG. 2 shows the invention in rear isometric view.

FIG. 2 shows a rear isometric view of the transporter 10 to illustrate the carriage driving mechanism. A belt 48 is affixed to carriage 28 by a clamp 49 (FIG. 1), and belt 48 is threaded about pulleys 56, 57, 58, and a drive pulley 59. Drive pulley 59 is connected to a motor 62, which is selectively activated by computer processor 15 to cause the drive pulley 59 to rotate to a selected position or to rotate a predetermined number of turns. When motor 62 is activated, either forwardly or rearwardly, belt 48 moves to cause carriage 28 to move upwardly and downwardly. Pulley 58 is preferably connected to a position encoder (not shown) which monitors pulley rotation and, therefore, can detect the vertical position of carriage 28. The position encoder is electrically connected to computer processor 15 to provide carriage position signals to the processor.

In operation, the sequence of movements of the carriage relative to the various other devices may be varied to fit particular circumstances, the following summary being a representative sequence. Since the recording time for certain CD programs may vary from under ten to forty or more minutes, it is usually advisable to utilize several recorders operating at the same time with one verifier checking the recorded data from each CD after the recording operation is complete. For example, if three recorders are used, one recorder could be arranged to be at the start of a recording operation, a second recorder could be in the middle of a recording operation, and the third recorder could be finishing a recording operation. In such case, the carriage would be positioned to receive the newly recorded CD from the third recorder and would then deliver the CD to the verifier for checking. Since the verifier operation can be very fast, it could easily be completed before the second recorder finishes its recording operation. The verified CD could then be delivered by the carriage to the printer for label printing and then delivered by the carriage to the carousel output bin. If the printing operation took sufficient time, the carriage could return to the carousel input bin to retrieve the next CD for recording and then deliver this CD to the third recorder (now empty) before returning to the printer to retrieve the CD with the newly printed label. Of course, the carousel position is coordinated with whichever operation is next needed to position an input bin, an output bin, or a reject bin beneath the carriage.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A transporter apparatus for performing sequential recording and printing operations on compact disks, comprising:

a) a horizontal base frame and a vertical frame affixed thereto;

b) a rotatable carousel positioned on said base frame, said carousel being rotatably positionable by a motor, said carousel having at least two bins for holding compact disks;

c) a carriage assembly affixed to said vertical frame, said carriage assembly having a vertically movable carriage, said carriage having a gripper for selectively gripping onto a compact disk, and said carriage being vertically movable into any one of said at least two bins positioned directly beneath and vertically aligned with said carriage;

d) a printer and at least one recorder vertically stacked on said base frame and adjacent to the vertical path of movement of said carriage, each of said printer and at least one recorder having an openable drawer which may be extended into a position beneath said carriage when said carriage is raised to an elevated position; and e) a computer processor having means for selectively moving said carriage, said carousel, and the openable drawers of said printer and said at least one recorder; and for selectively activating said gripper to sequentially move a compact disk between said carousel and said printer and said at least one recorder, for recording data on said disk and for printing label information on said disk and for loading said disk onto said carousel.

2. The apparatus of claim 1, further comprising a verifier vertically stacked on said base frame adjacent to the vertical path of movement of said carriage, said verifier having an openable drawer which may be extended into a position beneath said carriage when said carriage is raised to an elevated position.

3. The apparatus of claim 1, wherein said carriage assembly further comprises a pair of vertical, parallel spaced guide shafts, wherein said carriage is slidably mounted to said pair of guide shafts.

4. The apparatus of claim 3, wherein said carriage assembly further comprises a drive motor and a drive belt coupled to said drive motor and affixed to said carriage, said drive motor being electrically coupled to said computer processor.

5. The apparatus of claim 4, wherein said drive motor further comprises a positionable servo motor.

6. The apparatus of claim 3, wherein said carriage further comprises sensor means positioned adjacent said gripper for detecting when said gripper is engaged into a disk.

7. The apparatus of claim 6, wherein said gripper further comprises a solenoid electrically actuable by said computer processor, a pivotable arm connected to said solenoid, and a set of expandable gripper fingers connected to said pivotable arm.

8. The apparatus of claim 7, wherein said carriage further comprises a rotatable pulley coupled to said gripper fingers, a gripper motor having a drive pulley, and an endless loop belt coupled between said gripper motor drive pulley and said rotatable pulley; said gripper motor being electrically actuable by said computer processor.

9. The apparatus of claim 8, wherein said gripper motor further comprises a stepper motor.

10. The apparatus of claim 1, further comprising a camera affixed to the upper end of said carriage assembly, said camera having a downward field of view toward said carriage, and said camera being electrically coupled to said computer processor.

11. The apparatus of claim 1, further comprising a carousel drive motor affixed to said base frame, said carousel drive motor connected to said carousel for rotatably moving said carousel, said carousel drive motor being electrically actuable by said computer processor.

12. The apparatus of claim 11, wherein said carousel drive motor further comprises a servo motor.

13. The apparatus of claim 12, wherein said carousel further comprises an index mark; and further comprising an optoelectric sensor affixed to said base frame and positioned to sense said index mark, said sensor being electrically connected to said computer processor.

14. The apparatus of claim 13, wherein said carousel at least two bins further comprises three bins.

15. The apparatus of claim 14, wherein said disks further comprise recordable compact disks.

16. The apparatus of claim 1, wherein said at least one recorder, verifier and printer are each electrically connected to said computer processor and each have means for transmitting data between said computer processor and respective ones of said at least one recorder, verifier and printer.

17. An apparatus for automating the process of applying recorded information and label printing to compact disks, comprising:

a) a housing having a horizontal base and a vertical support member;

b) a rotatable carousel mounted on said base and a carousel drive motor mounted on said base and mechanically coupled to rotatably drive said carousel; said carousel having at least two bins, each of said bins sized to receive a plurality of stacked compact disks;

c) a carriage assembly attached to said base and to said vertical support member, said carriage assembly having at least one vertical guide post and a carriage slidably attached thereto; and a carriage drive motor attached to said base and mechanically coupled to said carriage, to slidably move said carriage along said at least one vertical guide post; and said carriage being vertically movable into any one of said at least two bins positioned directly beneath and vertically aligned with said carriage;

d) a compact disk recorder affixed above said base and adjacent said carriage assembly, said compact disk recorder having an openable drawer movable into alignment with and beneath said carriage when said carriage is raised to an elevated position;

e) a compact disk printer affixed above said base and adjacent said carriage assembly, said compact disk printer having an openable drawer movable into alignment with and beneath said carriage when said carriage is raised to an elevated position; and f) a computer processor attached to said housing, said computer processor having means for transmitting and receiving electrical signals to said compact disk recorder and said compact disk printer; said computer processor having further means for actuating said carousel drive motor and said carriage drive motor.

18. The apparatus of claim 17, further comprising a compact disk verifier affixed above said base and adjacent said carriage assembly, said compact disk verifier having an openable drawer movable into alignment with said carriage.

19. The apparatus of claim 17, further comprising a rotatable gripper mounted on said carriage, said rotatable gripper comprising gripper fingers for engaging into a compact disk, said gripper fingers mounted to a rotatable shaft, and pulley affixed to said shaft; and a gripper drive motor mounted on said carriage and mechanically coupled to said pulley to rotate said pulley.

20. The apparatus of claim 19, further comprising an electrically actuable solenoid attached to said carriage; and a pivotable arm attached to said solenoid; and means for expanding and contracting the relative positions of said gripper fingers connected between said gripper fingers and said pivotable arm.

21. The apparatus of claim 20, further comprising a compact disk sensor attached to said carriage, said sensor having means for detecting a compact disk engaged by said gripper fingers.

22. The apparatus of claim 21, further comprising a camera attached to said vertical support member and having a downward field of view; said camera being electrically connected to said computer processor.

23. The apparatus of claim 22, wherein said computer processor further comprises means for actuating said gripper motor in response to signals received from said camera; whereby said compact disk is rotatably oriented.

24. The apparatus of claim 23, wherein said carousel further comprises an index mark; and further comprising an index mark sensor mounted to said base and positioned to detect said index mark.

25. The apparatus of claim 24, wherein said carousel drive motor further comprises a servo motor electrically coupled to said computer processor; and said index mark sensor is electrically coupled to said computer processor.

26. The apparatus of claim 25, wherein said carousel at least two bins further comprise three bins having upwardly positioned openings for receiving compact disks.

27. The apparatus of claim 17, wherein said computer processor further comprises means for actuating each of said openable drawers of said recorder and printer after said carriage has been respectively positioned above an openable drawer.

* * * * *